Patented Oct. 28, 1952

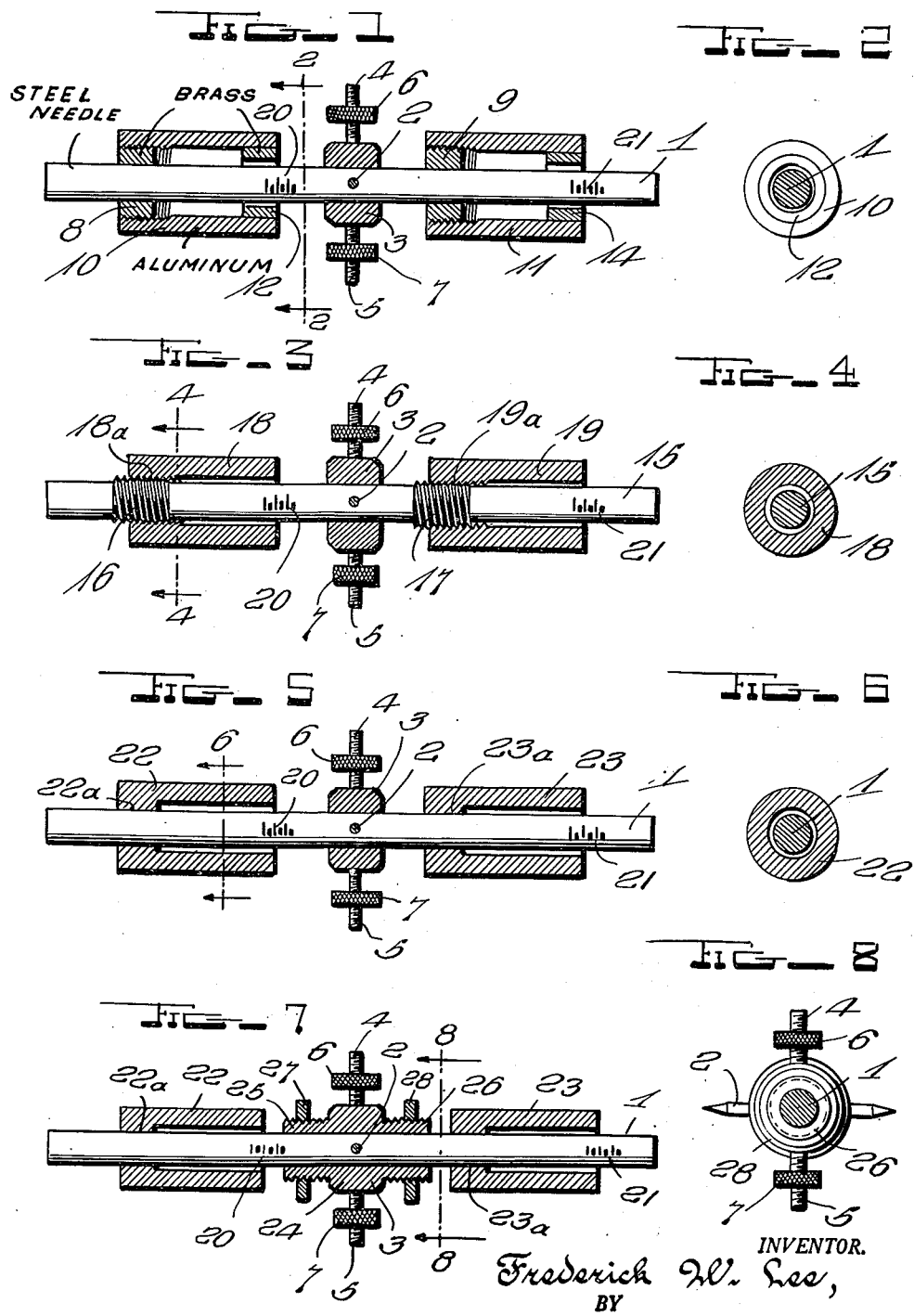

2,615,957

UNITED STATES PATENT OFFICE 2,615,957

TEMPERATURE COMPENSATION MAGNETOMETER INDICATOR

Frederick W. Lee, Owings Mills, Md.

Application June 17, 1948, Serial No. 33,512

8 Claims. (Cl. 175—183)

My invention relates broadly to magnetometers and more particularly to an improved temperature compensation system for the magnetic indicator of magnetometers.

One of the objects of my invention is to provide an adjustable compensation system for dynamically balancing the magnetic movable indicator of magnetometers.

Another object of my invention is to provide a temperature controlled system for dynamically balancing the moving element of a magnetometer compensating for variations in temperature conditions.

Still another object of my invention is to provide a system of dynamic balancing couples for the pivotally mounted magnetic indicator of a magnetometer selectively settable in balancing positions and controllable according to temperature conditions for compensating for variations in temperature for correspondingly maintaining the dynamic balance of the movable system.

Other and further objects of my invention reside in the arrangement of adjustable sleeves for applying a compensating mechanical couple to counterbalance any change in the magnetic couple of a magnetic indicator as set forth more fully in the specification hereinafter following by reference to the following specification, in which:

Figure 1 is a longitudinal sectional view showing one embodiment of the temperature compensation magnetometer indicator of my invention, with the magnetic needle shown in side elevation; Fig. 2 is a transverse sectional view taken substantially on line 2—2 of Fig. 1; Fig. 3 is a longitudinal sectional view of a modified form of adjustable temperature compensation magnetometer indicator constructed in accordance with my invention; Fig. 4 is a vertical sectional view taken substantially on line 4—4 of Fig. 3; Fig. 5 shows a longitudinal sectional view of a further modified form of temperature compensation magnetometer indicator embodying my invention; Fig. 6 is a vertical sectional view taken substantially on line 6—6 of Fig. 5; Fig. 7 is a longitudinal sectional view of a still further modified form of adjustable temperature compensation magnetometer indicator embodying my invention; and Fig. 8 is a transverse sectional view taken substantially on line 8—8 of Fig. 7.

My invention is directed to a construction of temperature compensation magnetometer indicator which may be dynamically balanced and compensated against variation due to changes in temperature. The construction of the indicator of my invention has been developed with a view of improving the efficiency, precision, and accuracy of measuring instruments of the magnetometer type. Means are provided for maintaining the dynamic symmetry of the sensitive magnetic needle of a magnetometer irrespective of variations in temperature.

Referring to the drawings in more detail, reference character 1 designates the magnetic needle of the magnetometer system. A centrally arranged arbor 2 extends through the magnetic needle 1 and serves as a pivotal mounting for the magnetic needle 1 about which the magnetic needle 1 angularly shifts. The arbor 2 extends through a central hub member 3 which serves as a support for diametrically projecting screw threaded rods 4 and 5, each of which carry adjustable screw-threaded members 6 and 7 thereon. Screw-threaded members 6 and 7 are knurled on their peripheral surfaces to enable the members to be adjusted toward or away from the hub member 3 for dynamically balancing the needle. The screw-threaded members 6 and 7 serve as weights which, when adjusted along the sensitivity adjustment screws formed by the screw-threaded rods 4 and 5, serve to precisely control the dynamic balance of the system.

The magnetic needle 1 is provided with a pair of spaced ring members 8 and 9 frictionally fitted on the magnetic needle 1 and adapted to be adjusted along the length thereof. Screw-threaded ring members 8 and 9 are formed from brass or other non-magnetic material and are externally screw-threaded to provide adjustable mounting means for the cylindrical aluminum sleeves 10 and 11 which are internally screw-threaded at the end thereof engageable with the externally screw-threaded ring members 8 and 9. The aluminum sleeves 10 and 11 have a different temperature coefficient of expansion than do the brass ring members 8 and 9 or the magnetic needle 1. The aluminum sleeve members 10 and 11 are each provided with annular guide ring members or counterweights 12 and 14 formed from brass and disposed internally in the ends of the sleeve members 10 and 11 and spaced from the magnetic needle 1 to form concentric guides for the sleeve members 10 and 11 with respect to magnetic needle 1, while enabling the sleeve members 10 and 11 to freely expand or contract in accordance with changes in temperature.

The fact that the sleeves 10 and 11 and the supporting rings 8 and 9 therefor, together with the guide rings and counterweights 12 and 14, have a different coefficient of expansion than the magnetic needle 1 formed from steel provides a mechanical couple which changes in effectiveness in proportion to temperature. The magnetic needle 1 is provided with a set of graduations at 20 and 21 immediately beneath the ends of the sleeves 10 and 11 serving as reference calibrations for the adjustable setting of the sleeves 10 and 11 with respect to needle 1 and to indicate the expansion and contraction of the sleeves longitudinally with respect to magnetic needle 1. The sleeve 10 expands to the right as does also the sleeve 11, thereby applying a couple tending to turn the needle 1 in a clockwise direction and correspondingly compensating for the loss of the magnetic couple due to changes in temperature. The expansion due to temperature introduces a couple by sum effect. The balancing effect of the expansible and retractible sleeve members 10 and 11 with respect to the magnetic properties of the magnetic needle 1 due to temperature changes can be demonstrated mathematically by showing the relationships between the vertical component $H_z$ of magnetic field or variations of the vertical component $\delta H_z$. Under this arrangement when the needle comes to rest in an equilibrium position, making an angle $a$ with the level line, the magnetic couple and the gravity restoring torque are equal and the following relations apply.

Gravity torque = magnetic torque
$Mg.a \sin a = H_z mb \cos a$

Here M is the mass of the rotating element, $a$ is the distance of center of mass from center of axis of rotation, $g$ is the gravity constant, $m$ is the pole strength of the field magnet, $b$ is the distance between the positive and negative pole of the associated field poles and $a$ is the angle of deflection. Under this special condition it follows directly that $$H_z = \frac{Mga}{mb} \cdot \frac{\sin \alpha}{\cos \alpha} = C \tan \alpha$$

The magnetic couple variation due to $\delta m$ the change in pole strength due to temperature is $H_z.\delta m.b \cos a$ and the mechanical compensating couple variations due to $\delta b'$ is $2g.M'.\delta b' \cos a$ where $b'$ is the distance to the center of gravity of the sleeves 10 and 11 from the arbor 2, and $\delta b'$ is the change of this length due to temperature. These two values are adjusted equal to each other and $H_z.\delta m.b \cos a = 2g.M.\delta b' \cos a$ From Equation 3 solving for $H_z$ $$H_z = \frac{2g \cdot M}{b} \cdot \frac{\delta b'}{\delta M}$$

From this relation is seen that for a given value of $H_z$ the ratio $b'/m$ can be adjusted to constancy. This relation would also apply to $$H_z + H_z = \frac{2g \cdot M}{b} \cdot \frac{\delta b'}{\delta m}$$

showing that a magnetic variometer which measures $\delta H_z$ would in this manner also be compensated for temperature variations. A temperature adjustment is needed for a latitude change of $H_z$. The calibrated scales 20 and 21 permit temperature adjustments of sleeves 10 and 11 for different value of $H_z$. Thus as the strength of the magnetic needle 1 becomes less with increase in temperature the sleeves 10 and 11 expand and apply a compensating couple to counterbalance changes in the magnetic couple.

Figs. 3 and 4 show a modified form of temperature compensating metallic needle where the magnetic needle is represented at 15 having a central mechanical balancing structure 2—7, similar to the structure described in Fig. 1 and wherein the needle 15 is directly screw-threaded at 16 and 17 in offset positions with respect to the pivot 2. The cylindrical sleeve members 18 and 19 are formed from material of a different temperature coefficient of expansion as compared with the steel needle 15 and are internally screw-threaded at 18a and 19a, respectively, to engage the screw threads 16 and 17 on steel needle 15. Steel needle 15 is calibrated similarly to the steel needle described in Fig. 1 and has graduations or calibrations thereon to permit the initial setting of the sleeve members and to indicate the expansion and contraction thereof. The form of mechanical couple shown in section in Fig. 3 provides a more precise means of mechanical adjustment than that described in connection with the structure in Fig. 1.

In Fig. 5 I have illustrated a further modified form of temperature compensating magnetic needle in which a pair of sleeve members 22 and 23 of aluminum or other material of different temperature coefficient of expansion than the magnetic needle 1 are provided with end sections having bores therethrough directly fitting over the magnetic needle 1. The sleeve members 22 and 23 have their ends apertured at 22a and 23a to slidably receive the magnetic needle 1 which is introduced therethrough. The sleeve members 22 and 23 may be adjusted in position along magnetic needle 1 and pre-set according to the calibrations 20 and 21 on magnetic needle 1. The sleeve members have their interior walls spaced away from the magnetic needle 1, except for the ends 22a and 23a which directly engage in magnetic needle 1.

In Fig. 7 I have shown a further modified form of temperature compensating magnetic needle wherein the hub member 3 is replaced by a modified form of hub 24 having tubular projections 25 and 26 integrally connected therewith and through which magnetic needle 1 extends. The projections 25 and 26 are externally threaded for receiving the adjustable weighted nuts 27 and 28 which may be turned to advance the nuts toward the pivot 2 or away from the pivot 2 for obtaining the required mechanical balance when the magnetic needle is pivotally mounted in its support in relation to the coacting pole faces of the field magnet with which the magnetic needle contacts. A similar adjustable balance system including elements 4—7 as heretofore explained in Figs. 1–5 is employed in the form of my invention shown in Fig. 7 for mechanically balancing the magnetic needle in a plane normal to the plane in which the magnetic needle is balanced by turning adjusting screws 27 and 28.

Sleeves of aluminum or material of different temperature coefficient of expansion as compared to the material of steel needle 1 are provided at 22 and 23 adjustably mounted at the ends 22a and 23a thereof on magnetic needle 1 in a manner similar to the arrangement described in Fig. 5. The position of sleeves 22 and 23 is predetermined by comparison with graduations 20 and 21 on needle 1 as explained in connection with the other forms of construction of my invention.

I have found the several structures described herein efficient and practical in manufacture, production and operation. I realize that modifications in construction may be employed and I desire that it be understood that no limitations upon my invention are intended other than may be imposed by the scope of the appended claims.

What I claim as new and desire to secure by Letters Patent of the United States is as follows:

1. In a temperature compensation system for a magnetometer indicator, a magnetic needle, means for pivotally mounting the needle, and means concentrically surrounding each end of said needle and having a temperature coefficient of expansion characteristic that is different from the temperature coefficient of expansion characteristic of said needle, said means being attached at one end only thereof to said needle intermediate the pivotal mounting of the needle and each of the ends thereof and expansible and contractible in accordance with changes in temperature for dynamically balancing said magnetic needle.

2. In a temperature compensation system for a magnetometer indicator, a magnetic needle, means for pivotally mounting said needle, means concentrically surrounding each end of said needle and having a widely different temperature coefficient of expansion than the temperature coefficient of expansion of said needle and attached to said needle intermediate the pivotal mounting thereof and each of the ends thereof and extending for a major portion of the distance between said pivotal mounting and each end of the needle and freely expansible and contractible with respect to said needle in accordance with temperature changes.

3. In a temperature compensation system for a magnetometer indicator, a magnetic needle, means for pivotally mounting said needle, means concentrically surrounding each end of said needle and having a widely different temperature coefficient of expansion than the temperature coefficient of expansion of said needle and attached to said needle intermediate the pivotal mounting thereof and each end thereof and freely expansible and contractible with respect to said needle in accordance with temperature changes, and extending for a major portion of the distance between said pivotal mounting at each end of the needle, said means each being selectively adjustable in position longitudinally of said needle between said pivotal mounting and each end of the needle.

4. In a temperature compensation system for a magnetometer indicator, a magnetic needle, means for pivotally mounting said needle, means having a widely different temperature coefficient of expansion than the temperature coefficient of expansion of said needle concentrically surrounding each end of said needle and connected with said needle intermediate the pivotal mounting thereof and the ends thereof and extending for a major portion of the distance between said pivotal mounting and each end of the needle freely expansible and contractible with respect to said needle in accordance with temperature changes, said means each being selectively adjustable in position longitudinally of said needle between the pivotal mounting and each end of the needle, and graduations carried by one side of said needle adjacent one extremity of each of said means for facilitating the setting of said means in position with respect to said needle.

5. In a temperature compensation system for magnetometer indicators, a central hub member, a magnetic needle carried by said central hub member, means pivotally mounting said central hub member and said magnetic needle, radially extending screw-threaded rods projecting from said hub member, adjustable weights adjustably engaging said screw-threaded rod members and selectively variable in position for dynamically balancing said magnetic needle, and elongated cylindrical members each having a temperature coefficient of expansion differing from the temperature coefficient of expansion of said magnetic needle concentrically surrounding each end of said magnetic needle intermediate the pivotal mounting thereof and each of the extremities of the needle and connected therewith.

6. In a temperature compensation system for magnetometer indicators, a central hub member, a magnetic needle carried by said central hub member, means pivotally mounting said central hub member and said magnetic needle, radially extending screw-threaded rods projecting from said hub member, adjustable weights adjustably engaging said screw-threaded rod members and selectively variable in position for dynamically balancing said magnetic needle, and elongated cylindrical members each having a temperature coefficient of expansion differing from the temperature coefficient of expansion of said magnetic needle concentrically surrounding each end of said magnetic needle intermediate the pivotal mounting thereof and each end of the needle, said cylindrical members each being attached to said needle and selectively and longitudinally adjustable along opposite ends of said magnetic needle intermediate the pivotal mounting thereof and the ends thereof.

7. In a temperature compensation system for magnetometer indicators, a central hub member, a magnetic needle carried by said central hub member, means pivotally mounting said central hub member and said magnetic needle, radially extending screw-threaded rods projecting from said hub member, adjustable weights adjustably engaging said screw-threaded rod members and selectively variable in position for dynamically balancing said magnetic needle, an annular member adjustably positioned on said magnetic needle intermediate each end of the needle and the central hub member, external screw threads carried by the surface of each of said annular members, cylindrical sleeves extending over said magnetic needle, each of said sleeves being internally screw-threaded for adjustably engaging the external screw threads on said annular members, and a ring-like counterweight disposed interiorly of each of the opposite ends of said cylindrical members for counterbalancing the effects of said annular members, said cylindrical members having a temperature coefficient of expansion differing from the temperature coefficient of expansion of said magnetic needle.

8. In a temperature compensation system for magnetometer indicators, a magnetic needle, pivotal mounting means for said magnetic needle comprising a central hub member having an internal bore for the passage of said magnetic needle, pivot means extending through said bore and said magnetic needle for keying said magnetic needle to said hub member, said hub member including a pair of externally screw-threaded cylindrical portions extending longitudinally of said needle, adjustable weights internally screw-threaded for engaging the external screw threads on said cylindrical portions of said hub for dynamically balancing said needle with respect to one plane, radially extending adjustable means connecting with said hub member for dynamically balancing said needle in other planes, and elongated cylindrical members concentrically mounted on each end of said magnetic needle intermediate the extremities thereof and the screw-threaded termini of said hub member and adjustable in longitudinal position between the pivotal mounting means and each end of the needle, said means having a differing temperature coefficient of expansion than the temperature coefficient of expansion of said magnetic needle.

FREDERICK W. LEE.

REFERENCES CITED

The following references are of record in the file of this patent:

UNITED STATES PATENTS

| Number | Name | Date |
|---|---|---|
| 1,909,619 | Herrick | May 16, 1933 |
| 1,943,850 | Truman | Jan. 16, 1934 |
| 2,010,245 | Roux | Aug. 6, 1935 |
| 2,487,047 | Farnham | Nov. 8, 1949 |
| 2,541,213 | Davidson | Feb. 13, 1951 |

FOREIGN PATENTS

| Number | Country | Date |
|---|---|---|
| 175,489 | Great Britain | June 22, 1889 |
| 448,647 | Great Britain | June 12, 1936 |